(12) United States Patent
Belady et al.

(10) Patent No.: US 8,041,967 B2
(45) Date of Patent: Oct. 18, 2011

(54) SYSTEM AND METHOD FOR CONTROLLING POWER TO RESOURCES BASED ON HISTORICAL UTILIZATION DATA

(75) Inventors: Christian L. Belady, McKinney, TX (US); Tom L. Vaden, Neshanic Station, NJ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1396 days.

(21) Appl. No.: 11/058,554

(22) Filed: Feb. 15, 2005

(65) Prior Publication Data
US 2006/0184287 A1    Aug. 17, 2006

(51) Int. Cl.
*G06F 1/26*    (2006.01)
*G06F 1/32*    (2006.01)

(52) U.S. Cl. ...................................... 713/320
(58) Field of Classification Search .................. None
See application file for complete search history.

(56) References Cited

U.S. PATENT DOCUMENTS

| 5,706,467 | A | 1/1998 | Vishlitzky et al. | |
|---|---|---|---|---|
| 6,311,105 | B1 | 10/2001 | Budike, Jr. | |
| 6,732,241 | B2 | 5/2004 | Riedel | |
| 6,862,623 | B1 * | 3/2005 | Odhner et al. | 709/226 |
| 2002/0004912 | A1 * | 1/2002 | Fung | 713/300 |
| 2002/0133728 | A1 * | 9/2002 | Agarwal | 713/324 |
| 2003/0023885 | A1 * | 1/2003 | Potter et al. | 713/300 |
| 2003/0056126 | A1 * | 3/2003 | O'Connor et al. | 713/300 |
| 2006/0149985 | A1 * | 7/2006 | Dubinsky | 713/324 |

* cited by examiner

*Primary Examiner* — Mohammed Rehman (57) ABSTRACT

A method comprises collecting utilization data for a resource, and predicting by a power management system, based on the collected utilization data, future utilization of the resource. The method further comprises controlling, by the power management system, power to the resource, based at least in part on the predicted future utilization of the resource. In one embodiment, the utilization data is collected for a plurality of resources that are operable to perform tasks, and the method further comprises determining, by the power management system, how many of the resources are needed to provide a desired capacity for servicing the predicted future utilization of the resources for performing the tasks. The method further comprises configuring, by the power management system, ones of the resources exceeding the determined number of resources needed to provide the desired capacity in a reduced power-consumption mode.

48 Claims, 5 Drawing Sheets

SYSTEM AND METHOD FOR CONTROLLING POWER TO RESOURCES BASED ON HISTORICAL UTILIZATION DATA

FIELD OF THE INVENTION

The following description relates generally to management of power consumption, and more specifically to systems and methods for controlling power to resources based on historical utilization of such resources.

DESCRIPTION OF RELATED ART

A major concern for many systems is utilization of the system resources. In general, a system resource is any part of a system that is capable of performing a task. Examples of resources typically found in computer systems include processors, input/output (I/O) devices, data storage devices, communication ports, displays, peripheral devices (e.g., printers, scanners, etc.), and so on. Of course, a "system" may be considered at any level of granularity. For instance, a plurality of computers communicatively coupled together via a communication network (e.g., a local area network (LAN), the Internet or other wide area network (WAN), etc.) may collectively be considered a system, wherein each computer may be considered a system resource. As another example, a large data center may be considered a system, and a plurality of computers (and other power-consuming resources) in the data center may each be considered a system resource. As another example, a printed circuit board within a personal computer (PC) may be considered a system, wherein each device (e.g., chip, etc.) implemented on the printed circuit board may be considered a system resource. The term "system" encompasses various types of computing systems, such as data centers, servers, personal computers (PCs), digital cameras, personal digital assistants (PDAs), laptops, workstations, mobile telephones, etc. Further, the term "system," unless otherwise qualified, is not limited to traditional computer systems, but may include any type of system having power-consuming resources, such as automobiles, airplanes, factories, etc.

Typically, a system is configured to ensure that it has sufficient resources to support a peak workload. For instance, consider the situation in which a computer server is implemented to service requests received from client computers (e.g., via a communication network, such as the Internet). An example of such a computer server is a web server for serving up web pages (and/or other information) to requesting clients via the portion of the Internet known as the Web. Such a web server may host a news or other informational website, such as the CNN.com website (http://www.cnn.com/), an online-store website from which items may be purchased, such as the AMAZON.com website (http://www.amazon.com/), and/or other types of websites. In this case, the web server needs certain resources for servicing client requests, such as one or more processors, communication ports, and data storage (e.g., memory) to name a few. The amount of each type of resource that is implemented in the web server may dictate the capacity of the web server for supporting a workload (e.g., a number of client requests presented concurrently to the web server). Typically, the web server is configured with sufficient resources (e.g., processors, communication ports, etc.) to support the anticipated peak workload of the web server. However, in most instances, the peak workload of the web server is encountered relatively infrequently, and thus for much of the time resources provisioned for the web server are under-utilized. However, as discussed further below, even when not being utilized, such resources are typically powered on to provide ready capability of supporting a portion of the workload. Thus, even when not being used for supporting a portion of the workload, the idle resources are typically consuming power.

Additionally, in many instances, companies have hundreds or thousands of web servers in a data center. Again, the number of web servers provisioned in the data center may be sufficient to support the anticipated peak workload of the website. However, the peak workload of the website is encountered relatively infrequently, and thus for much of the time many of the servers provisioned in the data center are under-utilized. Again, even when not being utilized, such servers are typically powered on to provide ready capability of supporting a portion of the website's workload. Thus, even when not being used for supporting a portion of the workload, the idle servers are typically consuming power, thus resulting in an unnecessarily large cost and lost profit to the data center.

Alternatively, a system, such as the above-mentioned web server or data center, may be configured to have fewer resources than needed for supporting the anticipated peak workload. For instance, the owner of the system may decide that it is more cost-efficient to provision fewer resources, and not provide the capacity for supporting the peak workload, which may result in client dissatisfaction and/or loss of sales to clients, etc. Particularly if the peak workload is encountered infrequently and for only short bursts of time, provisioning for some capacity less than that required for the peak workload may be acceptable for many systems.

Some systems are implemented such that resources are allocated for supporting different workloads. For instance, a computer system may be implemented with virtual partitions, wherein each partition is allocated certain resources of the system (e.g., certain processors, etc.) and has its own instance of an operating system (OS). In some implementations, the resources may be dynamically migrated from one virtual partition to another virtual partition. For instance, if a first virtual partition is encountering a large workload, while a second virtual partition is encountering a small workload, workload management control logic may dynamically migrate the idle resources of the second virtual partition to the first virtual partition. Thus, such an implementation attempts to maximize resource utilization across the various partitions.

Thus, much focus has generally been placed on the provision of sufficient resources for supporting workloads, and techniques for improving/maximizing utilization of resources of a system. In determining how many resources to implement for a system, a system owner generally considers the purchase price of the resources versus the amount of capacity provided by such resources. However, once employed in a system, the resources, such as processors, etc. of a computer system, generally consume power even when they are not being utilized for supporting a workload (i.e., when idle). That is, the resources are generally powered up to be available for providing the amount of capacity selected to be implemented by the system owner (e.g., sufficient capacity for supporting the peak workload, etc.). In most cases, system resources, such as servers, require time to initialize, and thus they are generally not powered off (or placed into some other power-saving mode, such as standby) when they are not being utilized because they would then not be immediately available for servicing an instant, unexpected demand (because of the time required for initializing them). Thus, there is an ongoing operational cost, in terms of power consumption, for employing resources within a system for supporting a workload. For certain system owners, such as owners of data centers, the electrical cost for powering the system's vast resources (e.g., servers, etc.) may be millions of dollars per year. Thus, such ongoing cost may significantly affect the profitability of an enterprise (e.g., a company) that owns the system, such as a data center. While the initial purchase price of the resources is generally considered by a system's owner in determining how many resources to employ in the system, the ongoing operational cost associated with powering the employed resources is often overlooked.

DETAILED DESCRIPTION OF THE INVENTION

Embodiments of the present invention provide a system and method in which historical utilization data for a resource is collected. A power management system predicts future utilization of the resource based on the historical utilization data of the resource. That is, the power management system uses the historical utilization data to forecast upcoming utilization of the resource. The power management system then controls power to the resource, based at least in part on its predicted future utilization.

Thus, for example, if a resource is historically used only from 3:00 P.M. to 5:00 P.M. on Monday through Friday, the power management system may, based on this historical utilization data, predict that this utilization pattern will continue, and accordingly may dynamically configure the resource into a power-saving mode for all times except for the predicted utilization times. Thus, during these times of low utilization, power usage can be conserved, thereby minimizing costs associated with such power usage (e.g., utility bills, etc.). Further, in certain embodiments, the power management system resumes full power to the resource sufficiently in advance of the predicted utilization of the resource occurring (i.e., prior to 3:00 P.M. on each of Monday through Friday in the above example) such that the resource is available for immediate use when needed, rather than having to wait for the resource to power up when it is needed. Accordingly, in certain embodiments, historical utilization data is used to predict future utilization, and based on such predicted future utilization the power management system places the resource into a power-conserving mode (e.g., powered off, standby, etc.) and further resumes full power to the resource sufficiently in advance of a predicted utilization of such resource so as not to negatively impact performance of the system. Thus, power can be conserved without sacrificing performance.

As another example, the power management system may be employed in a large data center, wherein historical utilization data for resources (e.g., servers, etc.) in the data center is collected. The power management system predicts future utilization of the resources, based on the historical utilization data, and can thus selectively place one or more of the resources (e.g., servers) into a power-conserving mode based on the predicted future utilization. Again, the power management system may resume full power to the resources (e.g., servers) sufficiently in advance of a predicted utilization of such resources so as not to negatively impact performance of the data center. Considering that electrical costs to a data center is often millions of dollars per year, the power management system may provide a significant cost savings to the data center without sacrificing performance of the data center, as described further herein.

Further, according to certain embodiments of the present invention, the power management system is capable of reassigning tasks among a group of resources to enable a desired level of utilization versus available capacity to be achieved on a number of the resources, and the remaining resources (i.e., the over-provisioned resources) are then dynamically configured by the power management system into a power-saving mode. As an example, suppose four servers are implemented, wherein from historical utilization data of the servers the power management system can predict that for a given interval of time each of two of the servers will be operating at 50% of their capacity and each of the remaining two servers will be operating at 10% of their capacity. In this instance, the power management system may, for this given time interval, power down the second two servers (or otherwise place them into power-saving modes of operation) and reassign their tasks to the first two servers, thereby resulting in a predicted utilization of 60% of each of the first two servers. Thus, the utilization of the first two servers is maximized, while reducing power consumption of the second two servers without sacrificing the ability to support the predicted workload. Of course, in certain embodiments, the power management system is configurable (e.g., via user-supplied parameters) such that a user (e.g., system administrator) can dictate, for example, the maximum utilization rate of the servers that is acceptable. Thus, for instance, the user may specify a desired utilization threshold to provide some safety factor that allows for capacity for servicing greater demand than that predicted.

Thus, according to one embodiment, the power management system determines how many of the resources of a system are needed to provide a desired capacity for servicing the predicted future utilization of the resources. Again, the desired capacity may be configured by a user to include some utilization threshold. The power management system then configures ones of the resources exceeding the determined number of resources needed to provide the desired capacity to be in a reduced power-consumption mode.

In certain embodiments, the power management system may, depending upon the predicted future utilization, completely power down a resource or place the resource into another power-saving mode from which it may be easier/faster to resume full operation of the resource. As one example, servers are generally designed to provide various power-saving modes, such as hard power down (e.g., flipping a switch to power off the system, which may be mechanically flipped by a servo or other controllable device), soft power down (e.g., software powering down the system), standby, sleep, and hibernate modes. These states, as well as other power-conserving states are known to be implemented for such computer devices as personal computers (PCs), laptops, etc. These, as well as any other power-conserving states now known or later developed for a resource, may be used by the power management system in accordance with embodiments of the present invention. As a further example, various power-conserving levels of "P-states" are available in certain processors available from Intel Corporation, and in certain embodiments such a processor may be placed by the power management system into a power-conserving P-state level based upon predicted future utilization of such processor.

Traditionally, a user may manually place the server into one of these power-conserving modes, as well as manually causing the server to resume its full operational mode. In embodiments provided herein, a power management system selectively places resources, such as servers, into a power-conserving mode based on historical utilization data, rather than requiring a user to manually do so. Further, the power management system may intelligently select which power-conserving mode to place a resource based on its predicted utilization. For example, if predicted that the resource will not be utilized for a short time period, the power management system may be configured to place the resource into a power-conserving mode from which the resource can be quickly recovered to its full-power mode, such as a standby mode; whereas if predicted that the resource will not be utilized for a long time period, the power management system may be configured to place the resource into a power-conserving mode that conserves greater power but requires longer to re-initialize to its full-power mode, such as a hard or soft power down. In either case, the power management system may account for the amount of time required for initializing the resource to its full-power mode from its current power-conserving mode, and begin such initialization sufficiently in advance of a predicted utilization of the resource such that the resource is readily available in its full-power mode as of the time at which the power management system predicts the resource to be needed for supporting a workload.

According to exemplary embodiments described herein, utilization of a resource (e.g., utilization of a server) is monitored over minutes, hours, days, months, years and/or some other time interval, and the utilization over such time interval(s) is statistically evaluated to determine a usage model over the time intervals (e.g., over a minute, hour, day, week, month, and year). Once the utilization is determined and the statistics understood, the resource (e.g., a server, such as a web server), is dynamically configured by the power management system into one of the power-saving modes mentioned above to minimize its power consumption under certain conditions. According to one embodiment, the power management system configures the resource into a power-saving mode if utilization of the resource drops and historic utilization data supports that power will not be in high demand during that time period. In other words, if utilization of a resource drops and such drop is consistent with the predicted utilization for the resource (based on the historical utilization data), and if the power management system further predicts that the utilization of the resource is to remain low over a certain upcoming time interval, then the power management system places the resource into a power-saving mode. Of course, the power management system may also monitor the actual, instantaneous utilization of the system, such that if the workload increases unexpectedly (contrary to that predicted), the power management system can take action to re-configure the resource into its full power mode for supporting a portion of the workload. Otherwise, the power management system predicts, based on the historical utilization data, when appropriate to configure the resource back to its full power mode to ensure that it is readily available to support a portion of an upcoming predicted workload increase.

Depending on the amount of risk that the resource manager (e.g., system owner) is willing to take, various parameters may be set to configure the operation of the power management system. As described further herein, the resource manager can, in certain embodiments, configure the power management system to use average, sigma, 2-sigma, and/or 3-sigma statistical data regarding the historical utilization of resources in predicting for a given time interval the amount of utilization for which to provision resources for supporting a workload versus resources to be configured in a power-saving mode.

Further, the power management system may be configured with fine granularity, such that it progressively powers down one resource at a time (while continuing to monitor the effect of powering down such resource) or powering down large blocks of resources depending on what makes more sense from a resource management standpoint. Similarly, as mentioned above, the power management system may be configured to power on the resources prior to the time at which the power management system predicts that utilization will increase.

Figure 1:
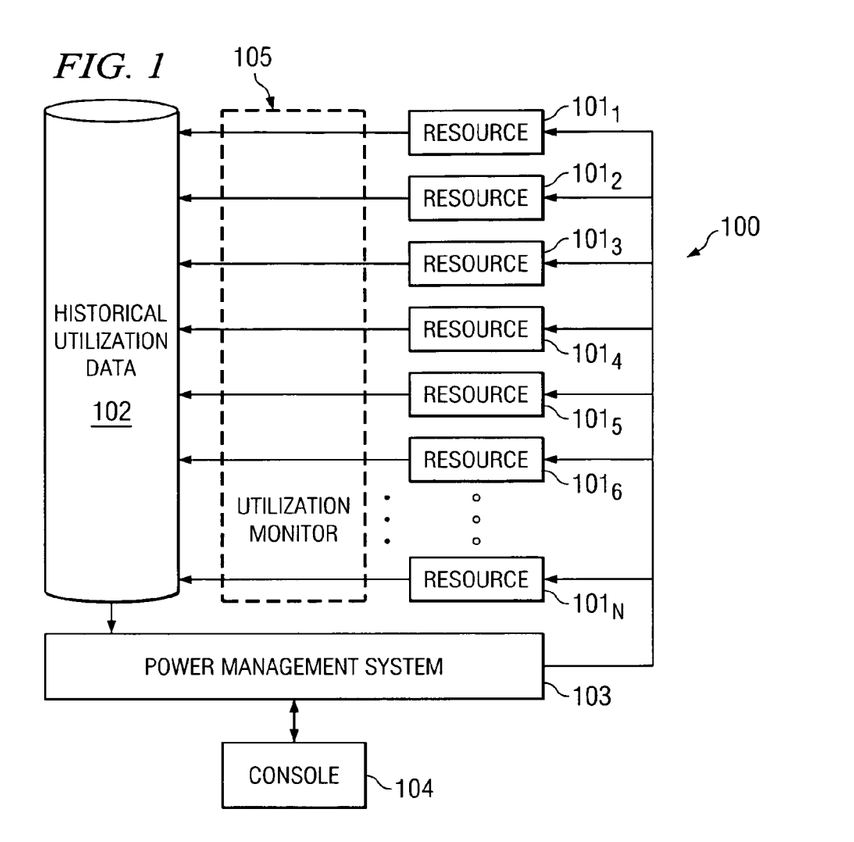
FIG. 1 shows a system according to one embodiment of the present invention in which a power management system manages power consumption of resources based on their historical utilization.

Turning to FIG. 1, a system 100 according to one embodiment of the present invention is shown. System 100 includes resources $101_1$-$101_N$ (referred to collectively as resources 101), wherein N may be any number. Resources 101 may be any type of resources, and in an illustrative embodiment are computing resources within a computer system (e.g., processor(s), communication port(s), etc.). In another illustrative embodiment, resources 101 may be resources, such as servers, in a data center. The resources 101 may include a number of resources of the same type (e.g., such that tasks may be reassigned from one resource to another), such as a plurality of processors or servers, and/or the resources 101 may include a variety of different resource types (e.g., which are incapable of supporting one another's respective tasks), such as a processor and a cooling system (e.g., fan). System 100 further includes historical utilization data 102 for each of the resources 101, which is stored to a computer-readable data storage medium, such as memory, hard disk, floppy disk, optical disc, etc. Historical utilization data 102 may be organized as a database, flat file, or any other suitable data structure. A utilization monitor 105 may be included for monitoring the resources 101 and creating/updating the historical utilization data 102. As described further herein, historical utilization data 102 includes data over some lapsed interval(s) of time (e.g., a minute, hour, day, week, month, year, etc.) identifying the amount of usage (or usage patterns) of the resources 101 during such lapsed interval(s). Utilization monitor 105 includes logic (e.g., software and/or hardware) for determining the amount of usage of each resource over such time interval(s) and updating the utilization data 102 to reflect such usage.

System 100 further includes power management system 103, which is operable to analyze historical utilization data 102 and, based at least in part on such historical utilization data 102, control the power of each of resources 101. For instance, in certain embodiments, power management system 103 uses the historical utilization data 102 to predict future utilization of resources 101, and based on such predicted future utilization, the power management system 103 dynamically varies the power modes of the resources in order to conserve power consumption. Power management system 103 may be implemented as software and/or hardware within system 100. In certain embodiments, power management system 103 may be implemented as part of an overall building management system that manages various aspects of a building (e.g., heating/cooling systems, security systems, etc.), such as a building that houses a data center.

Further, a console 104 is included in this exemplary embodiment to enable a user to input parameters to control/configure the power management system's operation, as described further herein. For example, a user may input parameters specifying an amount of capacity or utilization at which the power management system is to maintain the system, such as at the capacity needed for supporting the predicted workload or at some capacity above that needed for supporting the predicted workload (to provide a buffer in the event that the actual workload varies from that predicted). As another example, the user may input a parameter specifying that the management system is to maintain the resources at, say, 60% predicted utilization, 70% predicted utilization, or 80% predicted utilization, as examples, depending on the amount of risk and power conservation desired by the user. In other words, if the user has great trust in the accuracy of the predicted utilization, the user may select a higher utilization rate, which allows for a smaller amount of buffered capacity for handling any workload that exceeds the predicted amount. Thus, in selecting a higher utilization threshold to be employed by the power management system, the user takes a risk that the predicted utilization will be less than that actually encountered, and insufficient buffered capacity may be available for servicing the unexpected extra demand. Thus, a user may configure the parameters of the power management system to balance the user's desire for power conservation versus the user's desire to have the system capable of supporting an unexpected workload that exceeds the predicted workload.

For instance, suppose a system contains four servers, wherein the utilization predicted for each of the four servers is 45%; in this case, a first two of the four servers may be placed into a power-conserving mode with the remaining two servers absorbing the workload of the first two servers, resulting in a predicted utilization of 90% for each of the remaining two servers. As an alternative, a first one of the four servers may be placed into a power-conserving mode with the remaining three servers absorbing the workload of the first server, resulting in a predicted utilization of 60% for each of the remaining three servers. In the first scenario, greater power conservation is recognized, as two servers are placed into power conserving modes, rather than only one as in the second scenario. However, the first scenario leaves much less buffer for supporting an unexpected workload that exceeds the predicted workload, as each of the two servers in the first scenario are predicted to be operating at 90% utilization while each of the three servers in the second scenario are predicted to be operating at only 60% utilization. Again, the user (e.g., system administrator) can set the parameters of the power management system to employ any management scheme desired by the user.

The user-supplied parameters may even specify that the amount of capacity above that needed for supporting the predicted workload to be maintained by the power management system is to vary based on the volatility in the predicted workload. For instance, if the power management system predicts that over a relatively long time interval the workload placed on the system will be relatively constant, the parameters may specify that in this situation the power management system should configure the system with little buffer (e.g., not much more than the amount of resources needed to support the predicted workload are to be provisioned at full power); whereas if the power management system predicts that over a given time interval the workload placed on the system will be volatile/bursty, the parameters may specify that in this situation the power management system should configure the system with a large buffer (e.g., much more than the amount of resources needed to support the predicted workload are to be provisioned at full power to ensure sufficient resources to support spikes in the encountered workload). As mentioned further herein, in certain embodiments, the power management system 103 and/or console 104 may be part of a building management system, such as a management system of a data center, that may manage such items as heating/cooling, security, etc. for the building.

The user may further specify parameters regarding how power management system 103 is to manage the power consumption of each resource. For instance, the parameters may specify the particular power-saving mode (e.g., complete power down, standby mode, sleep mode, hibernate mode, power-conserving P-state level, etc.) that the power management system is to dynamically configure a given resource, which may vary for the given resource based on the particular conditions encountered. For instance, the parameters may specify that for a given resource, if it is predicted to be idle for a long time interval, the power management system is to power such resource completely down and then begin its power-up process sufficiently in advance of its predicted utilization; whereas, the parameters may further specify that for the given resource, if it is predicted to be idle for a short time interval (such as a time interval that would not allow much time before the power-up process of the resource would have to be started if the resource were powered completely down), the power management system is to place such resource into some other power-saving mode, such as standby or sleep, from which the resource can be more quickly re-provisioned to full power for supporting an upcoming predicted utilization. While illustrative examples are identified herein as to how the power management system may be configured for managing the power consumption of resources based on predicted utilization, any level of complexity may be supported for configuring the management scheme of the power management system, and thus the scope of the present invention is not intended to be limited to the exemplary schemes identified herein. Thus, any portion of the power management system's operation may be user-configurable in accordance with embodiments of the present invention, which enables a user to precisely define the power management scheme to be employed by the power management system.

In certain embodiments, the power management system may manage certain resources based on its management of other system resources. For instance, the power management system may manage a first set of resources based on the predicted future utilization of such resources (predicted based on the collected historical utilization data for such resources), and the power management system may manage certain other resources based on its management of the first set of resources. That is, the power management system may manage power consumption of certain resources not based on historical utilization data for such resources, but rather based on management of other resources. As one example, the power management system may manage power supplies based on its management of power-consuming resources of the system. For instance, power supplies are generally most efficient when loaded 80%. Thus, as the power management system places certain resources (e.g., servers of a data center) into a power-conserving mode, it may power down certain power supplies of the system in attempt to maintain the remaining power supplies at (or near) their optimum load (e.g., 80% loaded). Similarly, as the power management system re-initializes certain resources from their power-conserving mode to a full-power mode, the power management system may power on power supplies of the system in attempt to maintain the remaining power supplies at (or near) their optimum load (e.g., 80% loaded). Thus, as the power management system varies the power consumption of the resources, it may likewise vary the power supplies to maintain an optimum load on the power supplies.

As another example, the power management system may manage cooling systems based on its management of power-consuming resources of the system. For instance, as resources that require cooling are powered down by the power management system, the accompanying cooling resources may likewise be powered down by the power management system. In this regard, the power consumption of the associated cooling resources can be reduced along with reducing the power consumption of the resources that require cooling when they are fully operational.

In certain embodiments, the above-mentioned resources, such as power supplies and heating/cooling resources may have their power modes controlled by the power management system based upon predicted utilization of such resources. That is, historical utilization data may be collected for those resources, their future utilization may be predicted by the power management system based upon such historical utilization data, and their respective power modes may be dynamically controlled based upon such predicted future utilization in the manner described further herein.

Figure 2:
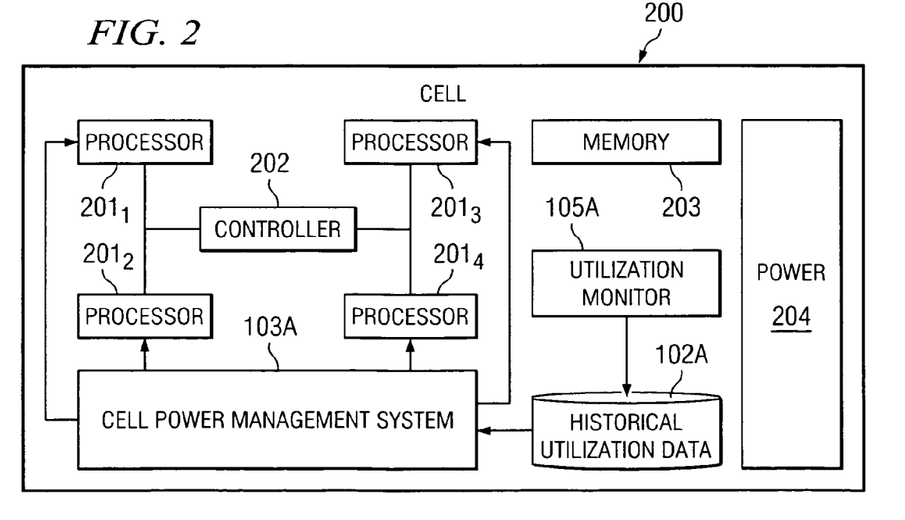
FIG. 2 shows an exemplary computing cell that includes multiple processors, in which a power management system according to an embodiment of the present invention is used for managing power of such processors based on historical utilization data of the processors.
Figure 3:
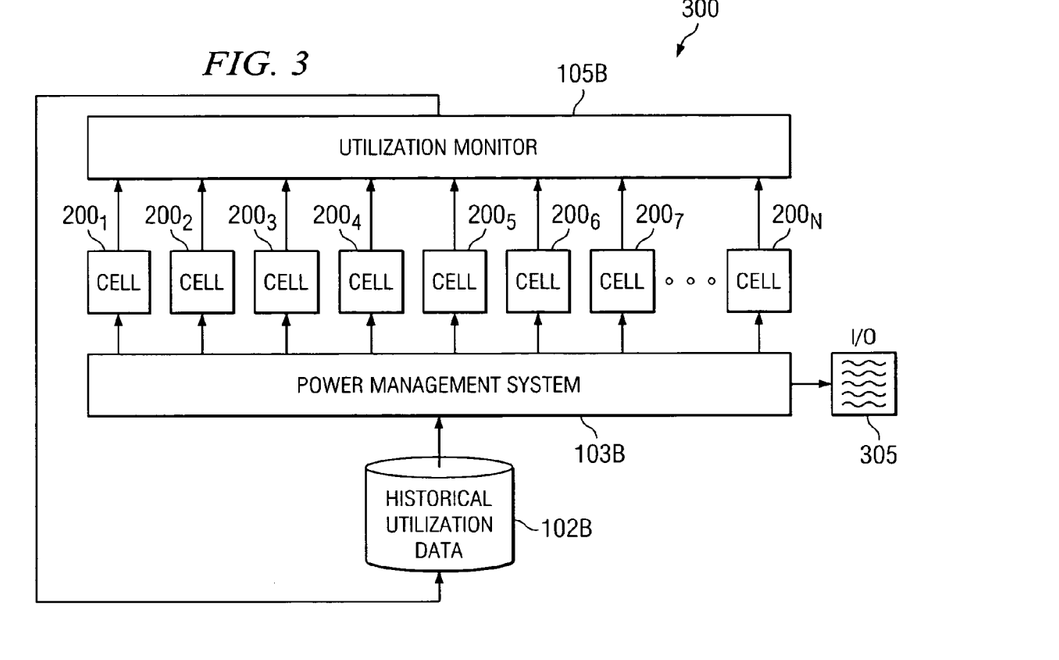
FIG. 3 shows an exemplary server that includes multiple computing cells, such as the cell of FIG. 2, wherein a power management system according to an embodiment of the present invention is used for managing power of such cells based on historical utilization data of the cells.
Figure 4:
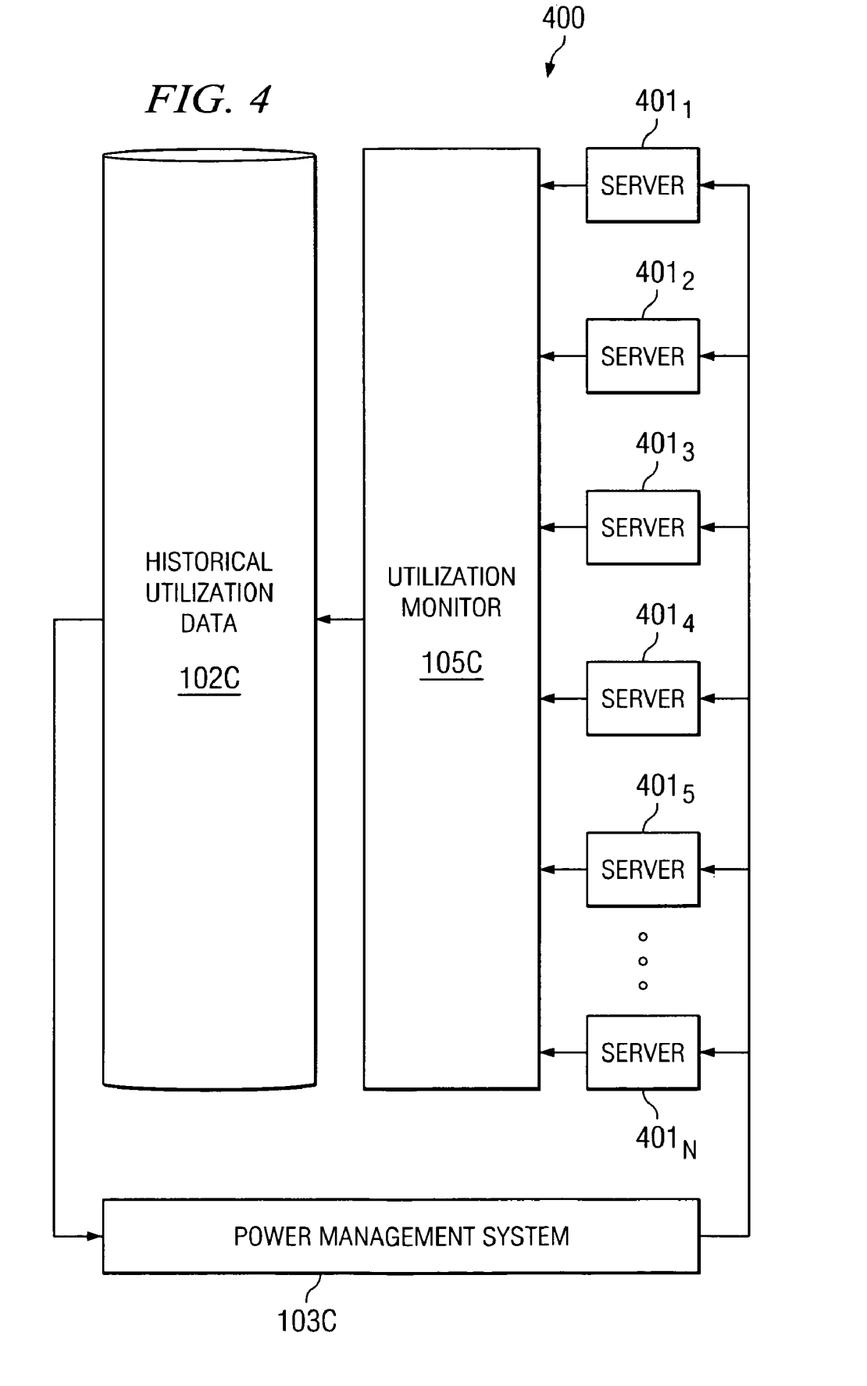
FIG. 4 shows an exemplary system of a plurality of servers, wherein a power management system according to an embodiment of the present invention is used for managing power of such servers based on historical utilization data of the servers.
Figure 5:
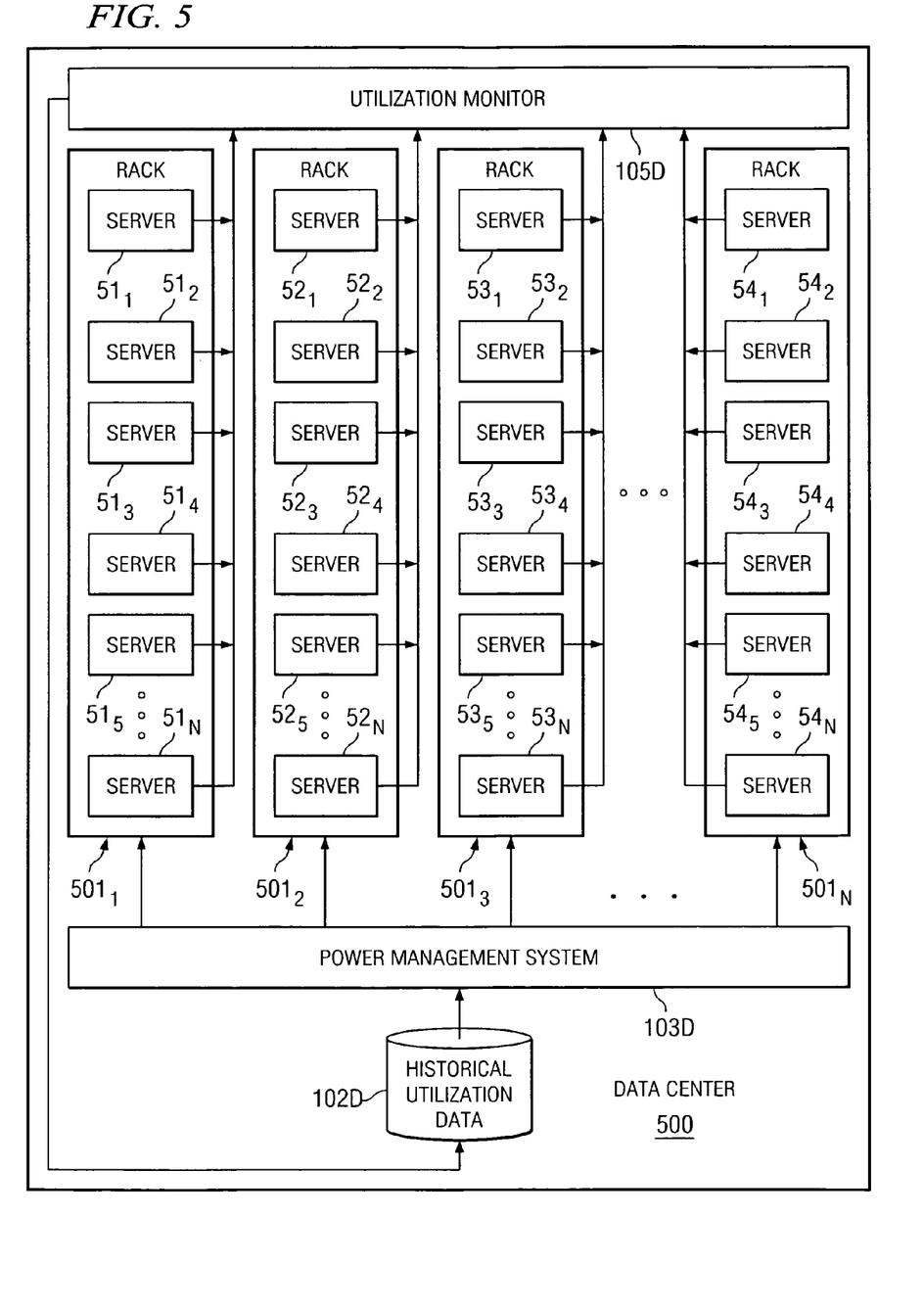
FIG. 5 shows an exemplary data center that includes a plurality of racks of servers, wherein a power management system according to an embodiment of the present invention is used for managing power of such servers based on historical utilization data of the servers.

Exemplary systems in which embodiments of the present invention may be employed are described below in connection with FIGS. 2-5. As described further below, FIG. 2 shows an exemplary computing cell that includes multiple processors (e.g., 4 processors), in which a power management system according to an embodiment of the present invention is used for managing power of such processors based on historical utilization data of the processors. FIG. 3 shows an exemplary server that includes multiple computing cells, such as the cell of FIG. 2, wherein a power management system according to an embodiment of the present invention is used for managing power of such cells based on historical utilization data of the cells. FIG. 4 shows an exemplary system of a plurality of servers (e.g., a rack of servers), wherein a power management system according to an embodiment of the present invention is used for managing power of such servers based on historical utilization data of the servers. And, FIG. 5 shows an exemplary data center that includes a plurality of racks of servers, wherein a power management system according to an embodiment of the present invention is used for managing power of such servers based on historical utilization data of the servers.

Thus, it should be recognized from these exemplary systems that embodiments of the novel power management system described herein may be employed on any type of system, from a very small-scale system such as a chip or printed circuit board that includes resources to be managed based on historical utilization data to a very large-scale system such as a data center. The concepts described herein are not limited in application to the exemplary systems/resources described in the below embodiments, but rather a power management system may be implemented in any power-consuming system for managing power modes of any power-consuming resources, including without limitation cells, servers, data centers, other computing systems/resources, I/O devices (e.g., hard drives, network ports, etc.), routers, switches, etc. Further, the power management systems may be nested at various levels of an overall system. For instance, a power management system may be implemented in each of the cells of FIG. 3, in the manner described with FIG. 2, for managing the power of individual resources of the respective cell, while a power management system is also implemented across the various cells in the manner described in FIG. 3. It should also be understood that while exemplary computing systems are described below for illustrative purposes, the concepts presented herein for managing power to resources are not limited to these exemplary systems but may likewise be applied to any other systems that include power-consuming resources.

Turning to FIG. 2, an exemplary computing cell 200 is shown that includes multiple processors (e.g., 4 processors) $201_1$-$201_4$ (referred to collectively as processors 201), in which a power management system 103A according to one embodiment of the present invention is used for managing power of such processors based on historical utilization data 102A of the processors. Exemplary cell 200 further includes controller 202, memory 203, and power supply 204. In this example, utilization monitor 105A is also included, which monitors the utilization of processors 201 and collects historical utilization data 102A. Power management system 103A analyzes historical utilization data 102A to predict future utilization of the processors 201, and based on such predicted future utilization, power management system 103A may selectively place one or more of the processors into a power-saving mode for intervals of time over which the predicted workload indicates that their utilization is unneeded. In some cases, this may include the power management system 103A reassigning tasks (e.g., applications, etc.) from a first processor to another processor, so as to remove any predicted utilization of the first processor for an interval of time such that it can be placed into a power-saving mode. Of course, while historical utilization data 102A is collected for processors 201 and power management system 103A manages power of such processors 201 in this example, in certain embodiments, historical utilization data 102A may additionally (or alternatively) be collected for other resources of cell 200, including without limitation memory 203, and power management system 103A may additionally (or alternatively) manage power of such other resources (e.g., memory 203).

Turning to FIG. 3, an exemplary server 300 is shown that includes multiple computing cells $200_1$-$200_N$ (referred to collectively as cells 200), such as the cell of FIG. 2, wherein a power management system 103B according to an embodiment of the present invention is used for managing power of such cells 200 based on historical utilization data 102B of the cells. The exemplary server 300 may, for example, be implemented as the server known as Superdome™ that is commercially available from Hewlett-Packard Company. In this example, utilization monitor 105B is also included, which monitors the utilization of cells 200 and collects historical utilization data 102B. Power management system 103B analyzes historical utilization data 102B to predict future utilization of the cells 200, and based on such predicted future utilization, power management system 103B may selectively place one or more of the cells into a power-saving mode for intervals of time over which the predicted workload indicates that their utilization is unneeded.

Of course, while historical utilization data 102B is collected for cells 200 and power management system 103B manages power of such cells 200 in this example, in certain embodiments, historical utilization data 102B may additionally (or alternatively) be collected for other resources of server 300, including without limitation input/output (I/O) resources 305, and power management system 103B may additionally (or alternatively) manage power of such other resources (e.g., I/O 305).

In some cases, the management of power of the cells may include the power management system 103B reassigning tasks (e.g., applications, etc.) from a first cell to another cell, so as to remove any predicted utilization of the first cell for an interval of time such that it can be placed into a power-saving mode. For example, suppose a total of 8 cells are implemented within server 300, and further suppose that from historical utilization data 102B the power management system 103B predicts that for a given interval of time each of a first four of the cells (cells 1-4) will be operating at 70% of their capacity and each of the remaining four cells (cells 5-8) will be operating at 10% of their capacity. In this instance, the power management system 103B may, for this given time interval, power down cells 5-8 (or otherwise place them into power-saving modes of operation) and reassign their tasks to cells 1-4, respectively, thereby resulting in a predicted utilization of 80% of each of the first four cells. Thus, the utilization of the first four cells is maximized, while reducing power consumption without sacrificing the ability to support the predicted workload.

As another example, suppose 20% utilization is predicted for each of the eight cells implemented in the server. As mentioned above, a user may input parameters configuring the operation of the power management system, including specifying a utilization threshold for each cell. Thus, assuming that the user inputs an 80% utilization threshold for each of the cells, the power management system may, in this case, place all but two of the cells into a power-conserving mode, wherein the 20% utilization predicted for each of the six cells that are placed in power-conserving mode is reassigned to the remaining two cells, thus resulting in a predicted 80% utilization for each of such remaining two cells.

Alternatively, to provide a greater utilization buffer (to enable the cells more capacity for servicing a greater workload than that predicted), the user may specify a lower utilization threshold for each cell. For instance, suppose the user specifies a 40% utilization threshold, the power management system may be configured in this case to place all but four of the cells into a power-conserving mode, wherein the 20% utilization predicted for each of the four cells that are placed in the power-conserving mode is reassigned to the remaining four cells, thus resulting in a predicted 40% utilization for each of such remaining four cells. The user can configure the management scheme to be employed by the power management system based on the user's comfort level, i.e., the user's desire to conserve power consumption versus the user's desire to provide a buffer of capacity above that predicted to be needed by the power management system (in case the prediction by the power management system is incorrect).

It should be recognized that in certain embodiments of the present invention power management systems may be nested. For example, each cell 200 of FIG. 3 may include a power management system 102A, as described in FIG. 2 above, which manages power consumption of the resources (e.g., processors) of the individual cells, in addition to power management system 102B managing power consumption across the various cells 200.

FIG. 4 shows an exemplary system (e.g., a "rack") 400 of a plurality of servers $401_1$-$401_N$ (referred to collectively as servers 401), wherein a power management system 103C according to an embodiment of the present invention is used for managing power of such servers based on historical utilization data 102C of the servers. In this example, utilization monitor 105C is also included, which monitors the utilization of servers 401 and collects corresponding historical utilization data 102C for each server. Power management system 103C analyzes historical utilization data 102C for each of the servers to predict future utilization thereof, and based on such predicted future utilization, power management system 103C may selectively place one or more of the servers into a power-saving mode for intervals of time over which the predicted workload indicates that their utilization is unneeded.

In this exemplary system 400, each of servers 401 may be implemented to support a common workload. For instance, each of servers 401 may be running an instance of an application to provide a website for supporting accesses by clients to such website. In such case, one or more of the servers 401 may be dynamically configured by power management system 103C into a power-conserving mode, and the workload is absorbed by the remaining servers. For example, suppose a total of 8 servers are implemented within server 300, and further suppose that from historical utilization data 102C the power management system 103C predicts that for a given interval of time 20% utilization is predicted for each of the eight servers. As mentioned above, a user may input parameters configuring the operation of the power management system, including specifying a utilization threshold for each server. Thus, assuming that the user inputs an 80% utilization threshold for each of the servers, the power management system may, in this case, place all but two of the servers into a power-conserving mode, wherein the 20% utilization predicted for each of the six servers that are placed in power-conserving mode is reassigned to the remaining two servers, thus resulting in a predicted 80% utilization for each of such remaining two servers.

In certain embodiments, one or more of the servers 401 may be a stand-alone server such that tasks (e.g., applications, processes, etc.) cannot be reassigned from that server to another server. However, in this case, the power mode of each individual server may still be controlled based on its respective predicted utilization. As one example, a first of the servers may support a particular application used by a business, while a second server supports another application used by the business. For instance, suppose a first server supports an application that is used between 9:00 a.m. and 5:00 p.m. on weekdays, a second server supports an application that is used in the evenings (e.g., to process nightly reports for the business), and a third server supports an application that is used to prepare tax filings for the company. Based on historical utilization data for each of the servers in this example, power management system 103C may predict that the first server is utilized between 9:00 a.m. and 5:00 p.m. on weekdays, the second server is utilized in the evenings, and the third server is utilized only during a portion of the year in which the company is preparing its tax filings (say, for instance, a few days in April). Accordingly, power management system 103C may configure each of the servers into a power-saving mode for those times for which they are not predicted to be utilized. For instance, the first server may be configured into a power-saving mode in the evenings and on weekends; the second server may be configured into a power-saving mode during the daytime; and the third server may be configured into a power-saving mode for much of the year (except for that portion of the year over which it is predicted to be utilized).

FIG. 5 shows an exemplary data center 500 that includes a plurality of racks $501_1$-$501_N$ (referred to collectively as racks 501) of servers, wherein a power management system 103D according to an embodiment of the present invention is used for managing power of such servers based on historical utilization data of the servers. Each rack 501 may be implemented as system 400 described above in FIG. 4. Rack $501_1$ includes servers $51_1$-$51_N$; rack $501_2$ includes servers $52_1$-$52_N$; rack 5013 includes servers $53_1$-$53_N$; and rack $501_N$ includes servers $54_1$-$54_N$. In this example, utilization monitor 105D is also included, which monitors the utilization of the servers and collects corresponding historical utilization data 102D for each of the servers. Power management system 103D analyzes historical utilization data 102D for each of the servers to predict future utilization thereof, and based on such predicted future utilization, power management system 103D may selectively place one or more of the servers into a power-saving mode for intervals of time over which the predicted workload indicates that their utilization is unneeded. As described above, in certain embodiments, tasks may be reassigned from certain servers that are to be placed in a power-conserve mode to other servers that are fully powered such that no impact on performance is noticed.

Figure 6:
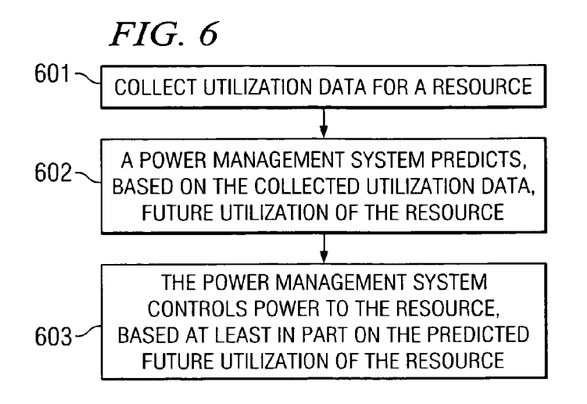
FIG. 6 shows an operational flow diagram according to one embodiment for managing power consumption of a resource based on collected utilization data of the resource.

Turning to FIG. 6, an operational flow diagram for controlling power of a resource according to one embodiment of the present invention is shown. In this exemplary embodiment, utilization data for a resource is collected at operational block 601. As discussed above, a utilization monitor may be implemented to monitor the resource's activity and store data reflecting utilization of the resource over some interval of time (e.g., minutes, hours, days, weeks, months, years, etc.). Of course, the monitoring of the resource's utilization may be ongoing by the utilization monitor, and such utilization monitor may continually/periodically update the utilization data stored for such resource.

In operational block 602, a power management system predicts, based on the collected utilization data, future utilization of the resource. For example, the power management system may predict that the future utilization will have some relationship to corresponding historical utilization data. For instance, suppose that over a year the resource is utilized heavily on Mondays and not utilized at all on Tuesdays; in this case, the power management system may predict that the resource will be utilized heavily on an upcoming Monday and not utilized on an upcoming Tuesday. Of course, the predicted utilization need not correspond identically to the corresponding historical utilization data. For instance, based on a year of historical utilization data, the power management system may detect a trend or pattern in the utilization that can be used to predict future utilization. For example, the power management system may detect a trend indicating a 10% increase in utilization from year to year, and thus the power management system may predict for a given time interval (e.g., day) that is approaching that the resource utilization will be 10% above that indicated in the historical utilization data for the corresponding time interval (e.g., corresponding day) of the previous year. Any mathematical technique now known or later developed for predicting future resource utilization based on historical utilization data may be employed by the power management system in accordance with embodiments of the present invention.

In operational block 603, the power management system controls power to the resource (e.g., dynamically controls the resource's power mode), based at least in part on the predicted future utilization of the resource. Thus, for instance, for an interval of time over which the resource is predicted to be idle, the power management system may dynamically configure the resource into a power-saving mode, such as powered off, standby, sleep, power-conserving P-state level, etc., and upon a time approaching at which it is predicted that the resource will be utilized, the power management system may dynamically configure the resource into full power mode such that it is readily available for supporting a workload at the time predicted that it will begin encountering such workload. As described above, in certain embodiments, the specific power-saving mode into which a resource is placed may be selected by the power management system based on certain conditions, such as the future predicted utilization of the resource. For instance, if the resource is predicted to be idle for a long period of time (above some threshold period), the power management system may place the resource into a first power-saving mode, such as powered off; and if the resource is predicted to be idle for a shorter period of time, the power management system may place the resource into a second power-saving mode, such as standby mode.

Figure 7:
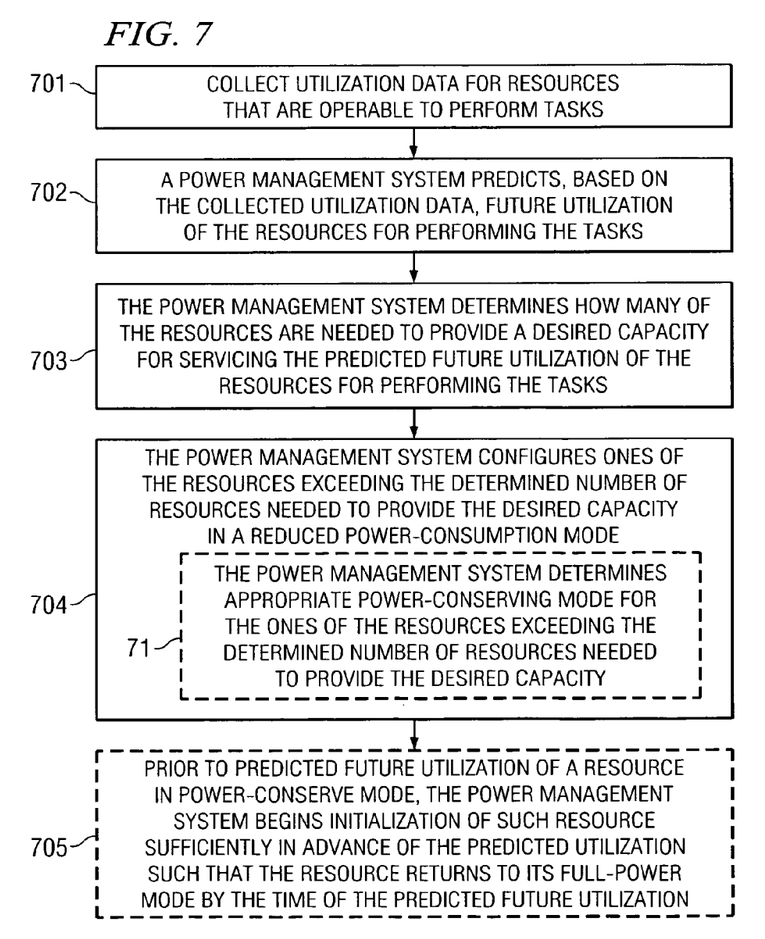
FIG. 7 shows an operational flow diagram according to one embodiment for determining resources needed for supporting a predicted workload and configuring the unneeded resources into a power-saving mode.

FIG. 7 shows an operational flow diagram according to one embodiment for determining resources needed for supporting a predicted workload and configuring the unneeded resources into a power-saving mode. In operational block 701, utilization data is collected for resources that are operable to perform tasks, such as servers that are operable to support client requests or processors that are operable to process instructions for applications, as examples. In operational block 702, a power management system predicts, based on the collected utilization data, future utilization of the resources for performing the tasks.

In operational block 703, the power management system determines how many of the resources are needed to provide a desired capacity for servicing the predicted future utilization of the resources for performing the tasks. As mentioned above, in certain embodiments the power management system may be configured (e.g., via user-input parameters) to provide an amount of capacity beyond the capacity that is sufficient for supporting the predicted utilization to enable the resources to readily support some degree of increased workload beyond that predicted (to account for some degree of error in the prediction), or the power management system may be configured such that the amount of capacity to be provided is to match closely (e.g., identically) with the amount predicted to be utilized over a given time interval. Thus, the "desired capacity" may be the capacity for supporting a predicted workload, or it may be some capacity greater than that needed for supporting the predicted workload (to allow for a buffer of capacity in the event that the actual workload is greater than that predicted).

In operational block 704, the power management system configures ones of the resources exceeding the determined number of resources needed to provide the desired capacity in a reduced power-consumption mode. For instance, suppose that for the exemplary cell 200 of FIG. 2, power management system 103A predicts that for a given time interval (e.g., for a given hour or given day), the workload to be encountered by the cell can be supported by two of the four processors 201. Accordingly, all of the tasks may be assigned to two of the processors, and the remaining two processors may be placed into a reduced power-consumption mode until such time as the power management system 103A predicts that they will be needed for supporting an approaching increased workload.

In certain embodiments, this operation of configuring resources into a power-conserving mode in block 704 includes operational block 71, in which the power management system determines the appropriate power-conserving mode for the ones of the resources exceeding the determined number of resources needed to provide the desired capacity. For instance, if the resources are predicted to be idle for a long period of time (above some threshold period), the power management system may place the resources into a first power-conserving mode, such as powered off; and if the resources are predicted to be idle for a shorter period of time, the power management system may place the resources into a second power-conserving mode, such as standby mode. Thus, the power management system may determine the appropriate power-conserving mode for the resources based on the predicted length of their respective idle times and/or other conditions.

In some implementations, if the power management system 103A detects that the workload increases unexpectedly (i.e., not as predicted), it may re-configure the two processors into full power mode such that they can begin supporting the workload before the time that the power management system 103A predicts that such processors will be needed. That is, certain implementations enable the power management system 103A to interrupt the power-consumption mode of a resource in the event that the power management system 103A detects that the actual workload is above that predicted.

In certain embodiments, the power management system re-configures a resource from its power-conserve mode to a full-power mode sufficiently in advance of a predicted utilization of such resource to enable the resource to fully power up by the time that it is predicted to be utilized. Accordingly, in certain embodiments operational block 705 is included, in which prior to a predicted utilization of a resource that is in power-conserve mode, the power management system begins initialization (re-configuration) of such resource sufficiently in advance of the predicted utilization such that the resource returns to its full-power mode by the time of the predicted future utilization. Different amounts of time may be required for returning a resource to full-power mode from different power-conserve modes. For instance, it may take longer to boot a server that is powered off than it takes to re-configure a server that is in standby mode to its full power mode. Thus, the power management system may take into consideration the length of time required for re-configuring the resource to full power mode from its current power-conserve mode in determining how much in advance of a predicted utilization of such resource the power management system should trigger the re-configuration of the resource to its full-power mode. Suppose, for example, that a server is placed into a power-conserving mode from which it takes 2 minutes to recover to full-power mode; in this case, the power management system may evaluate the predicted future utilization of the server and trigger the re-configuration of the server to its full-power mode at least 2 minutes in advance of a predicted upcoming utilization of such server.

Figure 8:
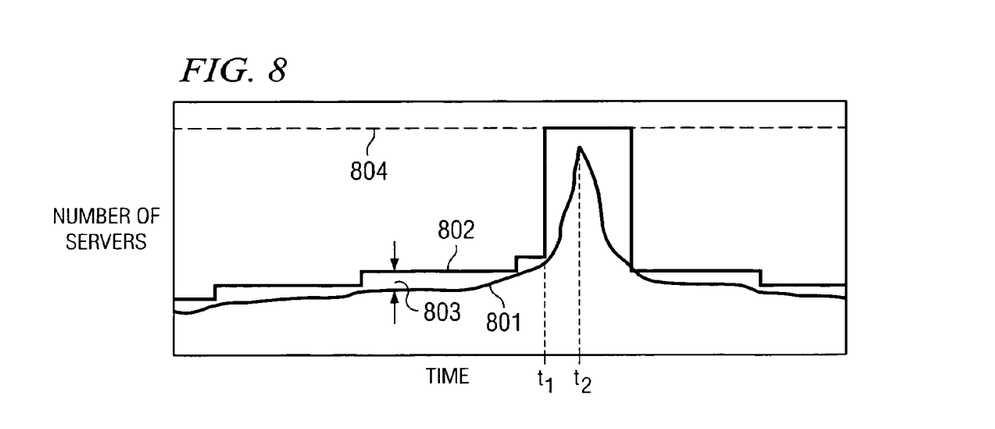
FIG. 8 shows a chart illustrating, over an interval of time, an exemplary number of servers providing capacity for supporting a predicted amount of utilization (based on historical utilization data) and a number of servers that may be implemented to provide a desired capacity relative to the predicted amount of utilization.

As mentioned above, the power management system may be configured (e.g., based on user supplied parameter values) to provide a desired capacity having some relationship to the capacity needed for supporting the predicted workload. FIG. 8 shows a chart illustrating, over an interval of time, a first line 801 that maps an exemplary number of servers needed for providing sufficient capacity for supporting a predicted amount of utilization and a second line 802 that maps a number of servers that may be implemented to provide a desired capacity relative to the predicted amount of utilization. In this example, the power management system is configured to provide some degree of capacity above that predicted to be needed, reflected as buffer 803 between the predicted capacity 801 and the capacity to be supplied 802. In other words, the power management system is configured to maintain some degree of buffer (or extra capacity) beyond that predicted to be utilized (to account for unexpected spikes in workload and/or errors in the prediction), and thus based on the exemplary capacity 801 being predicted as being utilized over the exemplary time interval shown, the power management system dynamically varies the number of servers that are fully powered at any given time in the manner shown by line 802, which has a relationship to the predicted capacity 801.

The number of servers above line 802 at any given time are considered extra servers that are not needed for supporting the expected workload, and thus those servers above line 802 may be dynamically configured into a power-saving mode by the power management system. In the exemplary chart of FIG. 8, the dotted line 804 represents all of the servers being on 100% of the time, as in traditional system configurations that do not implement a power management system that dynamically varies the power mode of servers based on predicted utilization thereof. Thus, the area between lines 804 and 802 represents the amount of servers that are placed into a power-savings mode by the power management system of one embodiment of the present invention, which demonstrates a potential for high energy savings over the exemplary time interval shown.

Further, as can be seen from this exemplary chart, the power management system can power the needed servers on sufficiently in advance of a predicted time at which their utilization is to occur. For instance, at time t1 the power management system increases the number of servers that are fully powered on in advance of their predicted utilization occurring at time t2. Thus, in this manner, the power management system continually looks ahead over the predicted utilization to anticipate the resources to be needed at an upcoming time interval, such that the power management system can begin powering up the resources predicted to be needed prior to the time at which they are predicted to be needed. In this manner, the time required for powering up the resources (or configuring them into their full power mode) can be accounted for, such that the resources are readily available for supporting a workload by the time at which they are predicted to be needed.

It should be understood that the power management system can be configured to manage power of resources based on the historical utilization data in accordance with various schemes. First, the predicted utilization of a resource (e.g., the predicted capacity required for supporting a predicted workload) may be computed in any of several different ways based on the historical data. For instance, the utilization of a resource could be predicted to match identically with the historical data, or the historical data could be used to detect trends, and the resource utilization may be predicted as being a modification of the historical utilization based on the predicted trend (e.g., 10% more utilization than the corresponding day of the previous year).

Second, various amounts of "buffers" (or over-capacity) may be implemented beyond that predicted as being required. For instance, an exemplary buffer 803 is shown in the example of FIG. 8. Further, the buffered capacity may vary based on the volatility in the predicted utilization. For instance, if the power management system predicts that over a relatively long time interval the workload placed on the system will be relatively constant, the power management system may be implemented to configure the system with little buffer (e.g., not much more than the amount of resources needed to support the predicted workload are to be provisioned at full power); whereas if the power management system predicts that over a given time interval the workload placed on the system will be volatile/bursty, the power management system may be implemented to configure the system with a large buffer (e.g., much more than the amount of resources needed to support the predicted workload are to be provisioned at full power to ensure sufficient resources to support spikes in the encountered workload).

Third, different power-saving modes may be selected for different resources. For instance, the power management system may be configured to power certain resources (e.g., processors) into a first type of power-saving mode (e.g., standby mode) when predicted that such resources are not needed, while another resource is to be configured into another type of power-saving mode (e.g., powered down) when predicted that it is not needed. Additionally, different power-saving modes available on a given resource may be selected under different conditions by the power management system. For instance, if predicted that a resource is to be idle for only a short period of time (and/or if the level of confidence in the prediction is low, e.g., due to relatively little historical utilization data or due to conflicting historical utilization data for a corresponding time period), the power management system may place the resource into a power mode from which it can be quickly restored to full power for supporting a workload; whereas, if predicted that a resource is to be idle for a long period of time (and/or if the level of confidence in the prediction is high, e.g., due to much historical utilization data being available), the power management system may place the resource into a power mode in which a greater power savings can be received (even though it may take longer to restore the resource to full power for supporting a workload).

What is claimed is:

1. A method comprising:
   collecting utilization data for a resource;
   inputting parameters specifying a desired capacity of said resource;
   predicting by a power management system, based on said collected utilization data, future utilization of said resource, wherein said parameters further specify that an amount of extra capacity above said predicted future utilization is to vary based on a volatility in said predicted future utilization of said resource; and
   controlling, by the power management system, power to said resource, based at least in part on said predicted future utilization of said resource and said input parameters.

2. The method of claim 1 wherein said collecting, predicting, and controlling comprise:
   collecting utilization data for a plurality of resources;
   predicting by said power management system, based on said collected utilization data, future utilization of said resources; and
   controlling, by the power management system, power to said resources, based at least in part on said predicted future utilization of said resources.

3. The method of claim 2 wherein said resources comprise computing resources in a system.

4. The method of claim 2 wherein said resources comprise servers in a data center.

5. The method of claim 2 wherein said resources comprise ones selected from the group consisting of:
   processors, memory, cells, servers, input/output (I/O) devices, power supplies, heating devices, cooling devices, switches, and routers.

6. The method of claim 2 wherein said controlling comprises:
   said power management system configuring ones of said resources into a power-conserving mode.

7. The method of claim 6 further comprising:
   absorbing by fully powered ones of said resources workload of said ones of said resources that are configured into said power-conserving mode.

8. The method of claim 6 wherein said controlling further comprises:
   said power management system configuring ones of said resources that are in said power-conserving mode into a full-power mode.

9. The method of claim 8 further comprising:
   said power management system beginning said configuring of said ones of said resources that are in said power-conserving mode into said full-power mode sufficiently in advance of a time of predicted utilization of said ones of said resources such that said ones of said resources are in said full-power mode by said time of said predicted utilization thereof.

10. The method of claim 2 wherein said power management system is nested in a hierarchy of power management systems.

11. The method of claim 1 wherein said controlling comprises:
    dynamically configuring said resource into a power-conserving mode.

12. The method of claim 11 wherein said controlling further comprises:
    selecting, by said power management system, one of a plurality of different power-conserving modes in which to configure said resource.

13. The method of claim 12 wherein said selecting comprises:
    selecting said one of a plurality of different power-conserving modes based at least in part on said predicted future utilization of said resource.

14. The method of claim 12 wherein said selecting comprises:
    selecting said one of a plurality of different power-conserving modes based at least in part on a predicted length of time that said resource will not be utilized.

15. The method of claim 11 wherein said plurality of different power-conserving modes comprise ones selected from the group consisting of:
    hard power down, soft power down, standby, sleep, hibernate, and power-conserving P-state level.

16. A method comprising:
    collecting utilization data for resources that are operable to perform tasks;
    inputting parameters specifying a desired capacity of said resources performing said tasks;
    predicting by a power management system, based on said collected utilization data, future utilization of said resources for performing said tasks, wherein said input parameters further specify that an amount of extra capacity above said predicted future utilization is to vary based on a volatility in said predicted future utilization of said resources;
    determining, by said power management system, how many of said resources are needed to provide the desired capacity and the extra capacity for servicing the predicted future utilization of the resources for performing said tasks; and
    configuring, by said power management system, ones of the resources exceeding the determined number of resources needed to provide the desired capacity and the extra capacity in a reduced power-consumption mode.

17. The method of claim 16 further comprising:
assigning, by the power management system, said tasks to the determined number of resources needed to provide the desired capacity.

18. The method of claim 16 wherein the configuring is performed dynamically by said power management system.

19. The method of claim 16 further comprising:
upon predicting by the power management system that ones of said resources configured in said reduced power-consumption mode are needed to provide said desired capacity for servicing a predicted future utilization, said power management system configuring ones of the resources that are in a reduced power-consumption mode into a full power-consumption mode.

20. The method of claim 19 further comprising:
said power management system beginning said configuring of said ones of said resources that are in said reduced power-consumption mode into said full power-consumption mode sufficiently in advance of a time of predicted utilization of said ones of said resources such that said ones of said resources are in said full power-consumption mode by said time of said predicted utilization thereof.

21. The method of claim 16 wherein said resources comprise servers in a data center.

22. The method of claim 16 further comprising:
absorbing by fully powered ones of said resources workload of said ones of said resources that are configured into said reduced power-consumption mode.

23. The method of claim 16 wherein said configuring further comprises:
selecting, by said power management system, one of a plurality of different reduced power-consumption modes in which to configure said ones of the resources exceeding the determined number of resources needed to provide the desired capacity.

24. The method of claim 23 wherein said selecting comprises:
selecting said one of a plurality of different reduced power-consumption modes based at least in part on said predicted future utilization of said resources.

25. The method of claim 16 wherein said plurality of different reduced power-consumption modes comprise ones selected from the group consisting of:
hard power down, soft power down, standby, sleep, hibernate, and power-conserving P-state level.

26. The method of claim 16 further comprising:
receiving input to said power management system for defining at least the desired capacity.

27. The method of claim 16 further comprising:
configuring, by said power management system, at least one related resource into a reduced power-consumption mode based at least in part on configuring said ones of the resources exceeding the determined number of resources needed to provide the desired capacity into said reduced power-consumption mode.

28. The method of claim 27 wherein said at least one related resource comprises power supplies for supplying power at least to the ones of the resources that are configured into said reduced power-consumption mode.

29. The method of claim 28 wherein said configuring said at least one related resource into a reduced power-consumption mode comprises:
powering down ones of said power supplies to maintain remaining ones of said power supplies at an optimum load.

30. The method of claim 27 wherein said at least one related resource comprises a cooling system for cooling the ones of the resources that are configured into said reduced power-consumption mode.

31. The method of claim 16 wherein said power management system comprises one of a plurality of nested power management systems.

32. A system comprising:
a power-consuming resource;
a console for inputting parameters specifying a desired capacity of the power-consuming resource;
utilization monitor for collecting utilization data corresponding to utilization of the power-consuming resource; and
power management logic for predicting, based on the collected utilization data, future utilization of said power-consuming resource, and for controlling power to said power-consuming resource based at least in part on the predicted future utilization thereof and in part on said input parameters, wherein said inputted parameters further specify that an amount of extra capacity above said predicted future utilization is to vary based on a volatility in said predicted future utilization of the power consuming resource, and wherein said controlling power is also based at least in part on said amount of extra capacity.

33. The system of claim 32 comprising:
a plurality of said power-consuming resources;
said utilization monitor for collecting utilization data corresponding to utilization of the power-consuming resources; and
said power management logic for predicting, based on the collected utilization data, future utilization of said power-consuming resources, and for controlling power to said power-consuming resources based at least in part on the predicted future utilization thereof.

34. The system of claim 33 wherein said resources comprise servers in a data center.

35. The system of claim 33 wherein said resources comprise ones selected from the group consisting of:
processors, memory, cells, servers, input/output (I/O) devices, power supplies, heating devices, cooling devices, switches, and routers.

36. The system of claim 33 wherein said power management logic for controlling power to said power-consuming resources comprises:
logic for configuring ones of said resources into a power-conserving mode.

37. The system of claim 36 further comprising:
fully powered ones of said resources for absorbing workload of said ones of said resources that are configured into said power-conserving mode.

38. The system of claim 36 wherein said power management logic for controlling power to said power-consuming resources further comprises:
logic for configuring ones of said resources that are in said power-conserving mode into a full-power mode.

39. The system of claim 38 wherein said power management logic for configuring ones of said resources that are in said power-conserving mode into a full-power mode further comprises:
logic for beginning said configuring of said ones of said resources that are in said power-conserving mode into said full-power mode sufficiently in advance of a time of predicted utilization of said ones of said resources such that said ones of said resources are in said full-power mode by said time of said predicted utilization thereof.

40. The system of claim 32 wherein said power management logic controlling power to said power-consuming resources further comprises:
  logic for selecting one of a plurality of different power-conserving modes in which to configure said resource based at least in part on said predicted future utilization of said resource.

41. The system of claim 32 wherein said plurality of different power-conserving modes comprise ones selected from the group consisting of:
  hard power down, soft power down, standby, sleep, hibernate, and power-conserving P-state level.

42. The system of claim 32 further comprising:
  a second power-consuming resource nested in a hierarchy of power consuming resources with said power-consuming resource so that said power-consuming resource is contained within said second power-consuming resource;
  a second utilization monitor for collecting utilization data corresponding to utilization of the second power-consuming resource; and
  second power management logic for predicting future utilization of said second power-consuming resource, and for controlling power to said second power-consuming resource.

43. A system comprising:
  power-consuming resources for performing tasks;
  means for inputting parameters specifying a desired capacity of the resources for performing the tasks;
  means for collecting utilization data corresponding to utilization of the resources for performing the tasks;
  means for predicting, based on the collected utilization data, future utilization of said resources; and
  means for controlling a power-consumption mode of the resources based at least in part on the predicted future utilization of said resources and in part on said input parameters, wherein said parameters further specify that an amount of extra capacity above said predicted future utilization is to vary based on a volatility in said predicted future utilization of said resource, said power consumption mode being further based on said amount of extra capacity.

44. The system of claim 43 wherein the controlling means comprises:
  means for determining how many of said resources are needed to provide a desired capacity for servicing the predicted future utilization; and
  means for configuring ones of the resources exceeding the determined number of resources needed to provide the desired capacity in a reduced power-consumption mode.

45. The system of claim 43 wherein said power-consuming resources comprise servers in a data center.

46. A data center comprising:
  a plurality of servers;
  a console for inputting parameters specifying a desired capacity of the plurality of servers;
  utilization monitor for collecting utilization data corresponding to utilization of the servers; and
  power management logic for predicting, based on the collected utilization data, future utilization of said servers, wherein said parameters further specify that an amount of extra capacity above said predicted future utilization is to vary based on a volatility in said predicted future utilization of said servers, said power management logic dynamically configuring ones of said servers into appropriate power-consuming modes based at least in part on the predicted future utilization thereof and in part on said input parameters.

47. The data center of claim 46 wherein said power management logic for dynamically configuring ones of said servers into appropriate power-consuming modes comprises:
  logic for determining how many of said servers are needed to provide a desired capacity for servicing the predicted future utilization; and
  logic for configuring ones of the servers exceeding the determined number of servers needed to provide the desired capacity in a reduced power-consumption mode.

48. The data center of claim 46 wherein said plurality of different reduced power-consumption modes comprise ones selected from the group consisting of:
  hard power down, soft power down, standby, sleep, hibernate, and power-conserving P-state level.

* * * * *